(12) United States Patent
Jia et al.

(10) Patent No.: US 12,381,772 B2
(45) Date of Patent: Aug. 5, 2025

(54) OPERATION AND MAINTENANCE MANAGEMENT METHOD AND SYSTEM FOR AUTOMATICALLY AND UNIFORMLY MANAGING NODES OF BASTION HOST

(71) Applicant: Hangzhou PingPong Intelligence Technology Co., Ltd., Hangzhou (CN)

(72) Inventors: Xiaohui Jia, Hangzhou (CN); Peng Chen, Hangzhou (CN); Zhehui Zhao, Hangzhou (CN); Yu Chen, Hangzhou (CN); Ning Wang, Hangzhou (CN); Shuai Lu, Hangzhou (CN)

(73) Assignee: Hangzhou PingPong Intelligence Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/293,749

(22) PCT Filed: Sep. 5, 2023

(86) PCT No.: PCT/CN2023/116980
§ 371 (c)(1),
(2) Date: Jan. 30, 2024

(87) PCT Pub. No.: WO2024/178940
PCT Pub. Date: Sep. 6, 2024

(65) Prior Publication Data
US 2025/0119338 A1      Apr. 10, 2025

(30) Foreign Application Priority Data

Mar. 2, 2023   (CN) .......................... 202310192294.1
Mar. 2, 2023   (CN) .......................... 202310223977.9

(51) Int. Cl.
*H04L 41/044*   (2022.01)
*H04L 9/30*   (2006.01)

(52) U.S. Cl.
CPC ............ *H04L 41/044* (2013.01); *H04L 9/302* (2013.01)

(58) Field of Classification Search
None
See application file for complete search history.

(56) References Cited

U.S. PATENT DOCUMENTS 5,659,746 A * 8/1997 Bankert .................. G06F 16/38
                                              707/999.009
6,675,205 B2 * 1/2004 Meadway ........... G06F 16/1834
                                              719/329

(Continued)

FOREIGN PATENT DOCUMENTS

CN          106657011 A        5/2017
CN          108090345 A        5/2018
(Continued)

OTHER PUBLICATIONS

International Search Report, issued in PCT/CN2023/116980, dated Nov. 22, 2023.

(Continued)

*Primary Examiner* — Ranodhi Serrao
(74) *Attorney, Agent, or Firm* — Zhu Lehnhoff LLP (57) ABSTRACT

Disclosed is an operation and maintenance method and system for automatically and uniformly managing nodes of bastion host. No matter distribution of user permission, daily deployment of machine monitoring and network monitoring or batch management of daily operation and maintenance, the operation and maintenance method and system can be abstracted as follows: master control dispatches a Master of a certain area node to issue and execute a certain task, and unified management is naturally achieved; the design concept can be continued subsequently. A Master host in the node serves as a master controller of the node, and related contents including a tool script library, a crontab task and a (Continued)

configuration file are preset in a Redis of the node in advance; when a new machine is accessed to a certain node, the new machine is configured to perform Salt-Master access management of the node where the new machine is located, and the corresponding machine is controlled to complete the corresponding task through a takeover program; therefore, unified and automatic management is realized.

17 Claims, 2 Drawing Sheets

(56) References Cited

U.S. PATENT DOCUMENTS

| | | | | |
|---|---|---|---|---|
| 6,912,564 | B1* | 6/2005 | Appelman | H04L 51/04 709/204 |
| 6,920,460 | B1* | 7/2005 | Srinivasan | G06F 16/2282 707/999.102 |
| 2002/0006803 | A1* | 1/2002 | Mendiola | H04L 61/45 455/466 |
| 2002/0007350 | A1* | 1/2002 | Yen | G06Q 30/0248 705/52 |
| 2002/0156917 | A1* | 10/2002 | Nye | H04L 63/104 709/245 |
| 2002/0188735 | A1* | 12/2002 | Needham | G06F 16/41 709/229 |
| 2003/0110126 | A1* | 6/2003 | Dunkeld | G06Q 20/10 705/39 |
| 2003/0126122 | A1* | 7/2003 | Bosley | G06F 16/134 |
| 2004/0064568 | A1* | 4/2004 | Arora | H04L 67/306 709/228 |
| 2005/0128944 | A1* | 6/2005 | Zhang | H04W 48/16 370/229 |
| 2013/0124685 | A1 | 5/2013 | Keitel et al. | |
| 2017/0019387 | A1* | 1/2017 | Ylonen | H04L 63/0435 |

FOREIGN PATENT DOCUMENTS

| | | |
|---|---|---|
| CN | 108551400 A | 9/2018 |
| CN | 110069335 A | 7/2019 |
| CN | 110955457 A | 4/2020 |
| CN | 111314282 A | 6/2020 |
| CN | 111835862 A | 10/2020 |
| CN | 112187491 A | 1/2021 |
| CN | 112527379 A | 3/2021 |
| CN | 113364758 B | 12/2021 |
| CN | 113765871 A | 12/2021 |
| CN | 113938321 A | 1/2022 |
| CN | 114244604 A | 3/2022 |
| CN | 114257436 A | 3/2022 |
| CN | 114500023 A | 5/2022 |
| CN | 116192600 A | 5/2023 |
| CN | 116232843 A | 6/2023 |

OTHER PUBLICATIONS

Written Opinion, issued in PCT/CN2023/116980, dated Nov. 22, 2023.
Search Report, issued in CN202310192294.1(priority application), by CNIPA, dated Mar. 27, 2024.
Search Report, issued in CN202310223977.9 (priority application), by CNIPA, dated Jun. 13, 2024.
Cable Television Technology, Issue 05, by Jianfeng Chen; Yongning Li; Yong Zhang;, Analysis of the Design and Application Prospects of Operational Bastion Hosts, dated May 15, 2015.
European Search Report, issued in EP23866615, dated Nov. 29, 2024.

* cited by examiner

OPERATION AND MAINTENANCE MANAGEMENT METHOD AND SYSTEM FOR AUTOMATICALLY AND UNIFORMLY MANAGING NODES OF BASTION HOST

BACKGROUND OF THE INVENTION

Field of the Invention

The invention relates to an operation and maintenance management method, in particular, to an operation and maintenance method and system for automatically and uniformly managing nodes of a bastion host.

Description of the Prior Art

Shanghai Shangxun Information Technology Co., Ltd. disclosed an operation and maintenance management system upgrading method and equipment based on bastion host in 202010956472X. According to the scheme, 1) firstly, an upgrading file package containing files to be upgraded and tool files is uploaded to a system background through the system foreground, and an upgrading command is sent to the system background; 2) and the system background carries out statistics to obtain quantity information of to-be-upgraded files to serve as denominator numerical value information of upgrading progress value information; 3) the system background executes the tool files, copies the to-be-upgraded files to corresponding target positions respectively, and records state information of each to-be-upgraded file in real time; 4) each time the tool files are executed, the molecular numerical information of the upgrade progress value information is incremented by 1, wherein the molecular numerical information of the upgrade progress value information is initially 1; 5) according to the denominator numerical information and the molecular numerical information of the upgrade progress value information, the upgrade progress value information is calculated and obtained in real time, and the upgrade progress value information is returned to the system foreground; 6) the upgrade progress value information is displayed in real time through the system foreground. Applying the invention to the operation and maintenance management system can not only accurately display the upgrade process and progress, but also provide tracking basis when an abnormality occurs in the upgrade.

Chengdu High-tech Vision Digital Technology Co., Ltd. in a patent numbered 202111093307.7, disclosed a method for operation and maintenance of a hosting-free host account through a bastion host. The method includes the following steps: S1, a user logs in the bastion host, the bastion host verifies whether a login user name and a password or a secret key are correct or not according to a user login credential, and if the login user name and the password or the secret key are correct, the user logs in the bastion host through authentication; S2, after successfully logging in the bastion host, according to the authority of the user, selecting a host needing to be accessed from the queried host list for operation and maintenance login; and S3, judging whether the password of the server is hosted to the bastion host or not, if the password of the server is not hosted to the bastion host, manually inputting the account password by operation and maintenance, and if the password of the server is hosted to the bastion host, filling the password stored in the database into the server for authentication so as to realize password-input-free login. According to the method, the problem that the user operates and maintains the server inconveniently through the bastion host can be effectively solved, the automation degree is higher, the operation and maintenance login time of the user can be shortened, the server login credential is not hosted to the bastion host, and the risk of credential leakage is reduced.

There is a technical flaw that unified management cannot be achieved for the existing bastion host systems. When there are a large number of hosts and users, the operation and maintenance management cost of the entire bastion machine is very high and the security cannot be guaranteed. Taking a host as an example, it involves the user's machine permission management, machine monitoring and management, and daily operation and maintenance management. If managed according to the above patent proposal, the cost is high and each has its own policies, making the entire management difficult.

SUMMARY OF THE INVENTION

The invention provides an operation and maintenance method and system for automatically and uniformly managing the nodes of bastion host so as to solve the problems high cost, separate policies and difficult overall management in the prior art.

In a first aspect, the invention provides an operation and maintenance method for automatically and uniformly managing nodes of bastion host, which includes:

S1: setting an architecture of the bastion host:
dividing according to independent network areas of respective business sites to treat each independent network environment in different regions as an independent node, and then in the nodes, planning a machine as a security entrance Login host of the nodes and a machine as an operation and maintenance management and control Master host of the nodes, the Master host being responsible for managing all business hosts of the node;

setting a Central control server as a superior Master host of the Login host and the Master host of each node, wherein the Central control server is deployed with a WEB system and has a build file and configuration information of a global system, and the Central control server regularly maintains synchronization of related data of the corresponding node with the Master host of the nodes;

S2: issuing and executing, by the Central control server, a task to the Master host of a target area node, wherein the task includes one of the tasks of issuing user permission management and control, machine monitoring, and daily operation and maintenance for a target machine of the node; S3: setting, by the Master host, a sentinel program to parse and complete operations for the corresponding task when the task is detected.

Further, the issuing a task of user permission management and control for a target machine of the target area node further includes:

by the Central control server, generating a Local-Login RSA key pairs for users who apply and are authorized, and giving permission to create a user account on the Login host corresponding to the target area node so that the users have their own independent account, and recording permission of the user in the Redis of the master controller, wherein the permission further includes contents such as related node information where the permission is adapted, a Master host, a permission type, and a permission aging length;

by the Central control server, sending the corresponding task to the Login host or the Master host of related nodes where the permission is adapted;

by the Master host, receiving the task, creating account information of the user, and recording user-machine information including the permission aging length into the Redis on the Login host of the target area node corresponding to the related nodes where the permission is adapted;

by each target area node, initiating a permission recovery program regularly to recycle the user-machine information whose permission has expired on the day to pass the user-machine information that is about to expire at an appointed time;

deleting the corresponding record in the Redis of the master controller, and issuing a task of the user permission management and control that the Master host of the corresponding node recovers permission of using the machine for the user when the Central control server receives an emergency user permission management including a personnel resignation.

Further, the method further includes: executing to be configured to manage Salt-Master access of the node when a new machine is accessed to a certain node: completing initialization operations of the new machine by running an access machine initialization script of the Master host of the node to give the new machine a standardized name and installing a Salt-Minion as well as configuring the Master host belonged thereto, and performing the management for access of the Master host of the node immediately after execution to record the Redis of the node and the Redis of a remote Central control server.

Further, the executing to be configured to manage Salt-Master access of the node when a new machine is accessed to a certain node further includes: executing a preset publishing machine public key acquisition program to obtain public key information corresponding to the new machine from a public key extension file in a preset location of the Redis of the node;

issuing a task of updating the public key to the Master host where the related node is located that is adapted to the user permission when the Central Master host generates the Local-Login RSA key pairs or updates the public key for the users who apply and are authorized;

receiving the public key update, by the Master host, to update the new public key information in the public key extension file in the corresponding location of the Redis of the node;

at the same time, obtaining, by the corresponding machine, the corresponding updated public key information of the new machine from the public key extension file at the preset location in the Redis of the node.

Further, the executing the Master host to complete a task of daily operation and maintenance includes:

the executing to be configured to manage Salt-Master access of the node when a new machine is accessed to a certain node further includes: obtaining a tool script library of a determined location in the Redis of the node to facilitate the synchronized series of a tool script for the user to use, writing a crontab task at the preset location including a disk cleanup task and a salt-minion automatic pull task, and automatically configuring a configuration file at a specified location;

sending, by the Central control machine, an update and/or an extension task including the tool script library, the crontab task, and the configuration file to the Master host of the corresponding node;

updating, by the Master host of the corresponding node, related contents such as the tool script library, the crontab task, and the configuration file corresponding to the specified location;

taking over, by the Master host, the corresponding machine to process contents related to the corresponding locations.

Further, the method further includes:

by the Central control server, setting the build file and the configuration information of the global system, and regularly synchronizing and backing up core data to the Master host of the nodes while synchronizing the build file and the configuration information of the global system to an enterprise Git repository;

updating the build file and the configuration information of the global system to the enterprise Git repository when a problem occurs with the Central control server;

obtaining and generating a new Login host and a new Master host from the Central Master host through a template when a problem occurs with the Login host or the Master host.

Further, the method further includes:

by the Central control server as a dispatch center, managing the Login host and the Master host of respective independent nodes to indirectly and uniformly manage the host of the nodes;

by the Central control server, deploying the WEB system to consolidate various daily necessary functions, unifying the various collected data as a data overview to display IT resources of all nodes, and displaying real-time monitoring of related data according to an application grouping dimension.

Further, the method further includes:

setting a sentinel program for each Master host, which is responsible for monitoring and recording events such as access and offline of the business host of the node where the sentinel program is located, and jointly updating the configuration file used for local monitoring or batch operation and maintenance, the configuration file used for batch operation and maintenance further comprising the configuration file in the application group dimension; and setting an initialization script of the accessed new machine on the Master host of the nodes;

triggering, by the Master host of a certain node, a Salt-Minion access event once a certain node is accessed to a new business host: performing initialization steps including naming the new machine according to the three-section rule of application group-intranet IP-network area, installing the Salt-Minion on the new machine and configuring the Master host belonged thereto after the new machine executes the initialization script;

when a certain application group updates operation and maintenance management data, determining the node where the application group is located, obtaining all machine names of the same application group through the Master host of the corresponding node according to an application group field, and further writing a batch operation and maintenance management configuration file to the above machines through the Salt-Minion.

Further, the method further includes:

automatically generating a monitoring configuration file of Prometheus on the business host;

by the local Master host, detecting an alarm message, and synchronizing the alarm information including a host name where the alarm is located to the Central control server;

by the Central control server, parsing the application group and the network area where the alarm information host is located through the host name where the alarm information occurs;

issuing the corresponding execution task to the Master host of the node that is adapted if the corresponding business host of the network area and/or the application group needs to be processed according to the alarm information.

Further, the method further includes:

finding the Master host belonged thereto according to the network area field and performing the corresponding task when the Central control machine parses the business host name;

completing naming the new machine according to the three-section rule of the application group-intranet IP-network area after the new machine executes the initialization script, the network areas having an independently named intranet IP, the intranet IPs in different network areas being the same.

Further, the method further includes:

exposing, by the Login host as the security entrance machine of the node where the Login host is located, a standard sshd port to the outside so that the user is assigned a login_id_rsa to log in to the corresponding Login host to enter an intranet of the node where the Login host is located.

Further, the method further includes: deploying a basic component on the Master host of the node, which further comprises: deploying the Salt-Minion to receive a dispatch task from the Central control server, deploying a Redis to record the related data corresponding to user permission-machine in the node, and deploying the Salt-Master to receive and manage the business host with the Salt-Minion installed in the node;

not exposing, by the Master host as the operation and maintenance management and control machine in the network area, any ports to the outside, and trusting the network access of the Central control server internally;

synchronizing, by the Central control server, respective basic template management after the initial installation of the Login host and the Master host of the nodes is completed: completing, by a #salt -N login state.apply group.login, template synchronization to the Login host, and completing, by a #salt -N master state.apply group.master, template synchronization to the Master host.

In a second aspect, the invention provides an operation and maintenance system for automatically and uniformly managing nodes of bastion host, which includes:

an architecture of the bastion host:

dividing according to independent network areas of respective business sites to treat each independent network environment in different regions as an independent node, and then in the nodes, planning a machine as a security entrance Login host of the nodes and a machine as an operation and maintenance management and control Master host of the nodes, the Master host being responsible for managing all business hosts of the node;

a Central control server, as a superior Master host of the Login host and the Master host of each node, wherein the Central control server is deployed with a WEB system and has a build file and configuration information of a global system, and the Central control server regularly maintains synchronization of related data of the corresponding node with the Master host of the nodes, and the Central control machine is used to issue a task to the Master host of the target area node, the task including one of the tasks of issuing user permission management and control, machine monitoring, and daily operation and maintenance for a target machine of the target area node;

the Master host is used to set a sentinel program to parse and complete operations for the corresponding task when the task is detected.

Further, the Redis is set on the nodes with a determined location stored with a tool script library, a crontab task and a configuration file respectively, the tool script library providing a series of synchronization a tool script for the user to use conveniently; the crontab task includes a disk cleanup task and a salt-minion automatic pull task;

the Master host is further configured to receive an update and/or an extension task including the tool script library, the crontab task and the configuration file sent from the Central control server to the Master host of the corresponding node, to update the tool script library, the crontab task, the configuration file and other related contents corresponding to the specified location, and then taking over to process the contents related to the corresponding location.

Compared with the prior art, the invention can achieve the following beneficial effects: no matter distribution of user permission, daily deployment of machine monitoring and network monitoring or batch management of daily operation and maintenance, the operation and maintenance method and system can be abstracted as follows: master control dispatches a Master of a certain area node to issue and execute a certain task, and unified management is naturally achieved; the design concept can be continued subsequently to integrate the management of container clusters and continuously expand management objects to make the functionality more powerful and efficient, wherein to a certain extent, there is no difference between managing dozens of network areas and managing one network area for the bastion machine; whether there are a few machines or dozens or thousands of machines, the management cost will not change significantly.

DESCRIPTION OF THE PREFERRED EMBODIMENTS

The industry has many solutions for the safe and efficient management of large amounts of hosts, such as Ansible, Puppet, and SaltStack, which can all solve the problem of efficient and safe management of large amounts of hosts in enterprises to a certain extent. According to the emergence time of these tool systems, first there was Puppet (full-featured and complex), then Ansible (simple and convenient), and then SaltStack (efficient and simple). SaltStack can understand and balance the two and introduce many new ideas. SaltStack is a centralized management tool for server infrastructure based on C/S architecture. It is called Master on the management side and Minion on the client side. SaltStack has configuration management, remote execution, monitoring and other functions. SaltStack of open source version only provides basic solutions. However, in actual work, a lot of maintenance skills are still required, such as grouping and monitoring configuration issues, as well as the challenges of operation and maintenance management of multiple independent network nodes in the enterprise. We expect to be able to conduct unified control and automatic monitoring of multiple network environments. We hope to achieve a goal of not relying on cross-node network connectivity. The network connectivity can certainly solve some problems, but considering the more scientific real-time collection of monitoring data for large amounts of business hosts through individual intranets and the future expansion of ultra-large-scale IT systems, a separate internal self-governance solution for nodes is considered.

The invention is described in detail with reference to the particular embodiments below. The following embodiments will be conducive to further understanding by those skilled in the art on the invention, but is not intended to limit the invention in any forms. It should be pointed out that for those of ordinary skill in the art, the invention can be transformed and modified in many ways without departing from the spirit of the invention. All of these fall within the scope of protection of the present invention.

Figure 1:
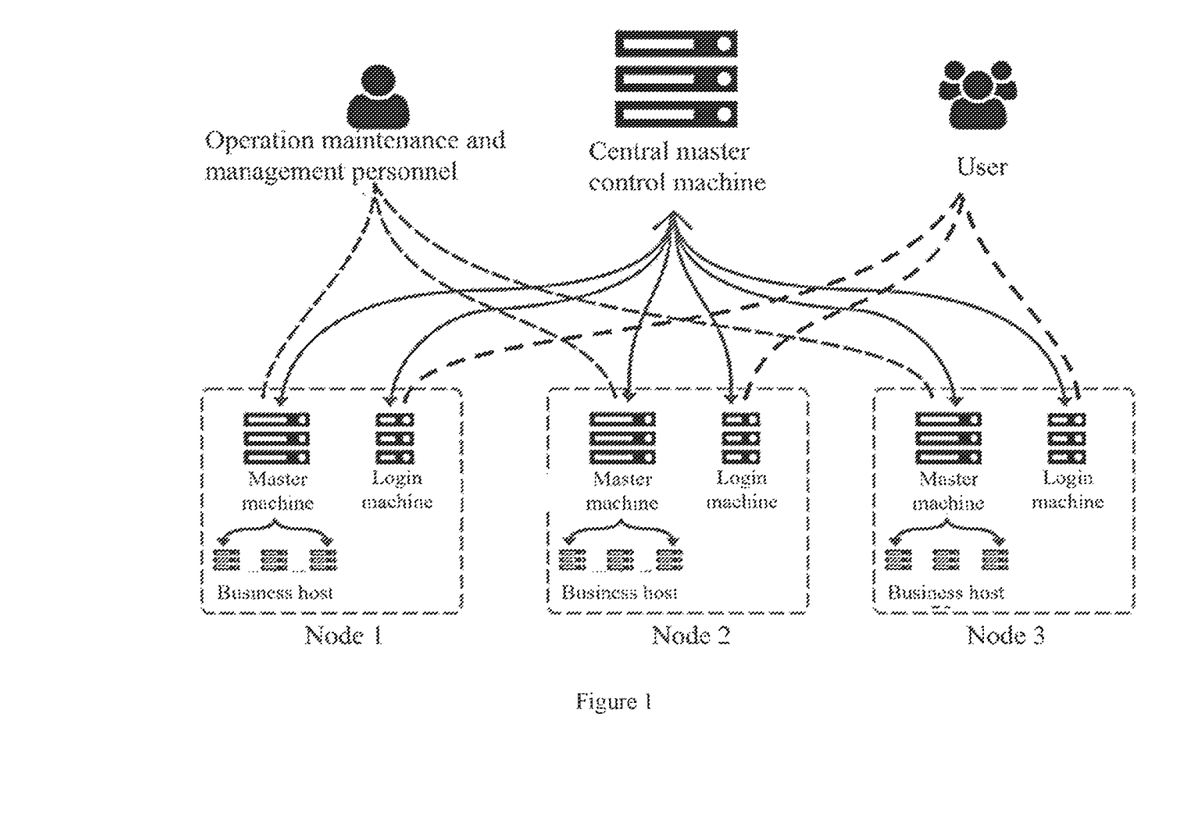
FIG. 1 is an example diagram of the principle of an operation and maintenance management system according to an embodiment of the invention.

With reference to FIG. 1, a view of multi-operation and maintenance management system is shown. The invention divides according to independent network areas of respective business sites to treat each independent VPC network (Virtual Private Cloud, hereinafter referred to as VPC network) in different regions as an independent node, and then plans two machines in the nodes, of which one is served as a security entrance Login host (functioning like the current jumpserver) and the other is served as a machine as an operation and maintenance management and control Master host of the nodes; related basic services are deployed in the Login and Master respectively, and the Master is responsible for managing all business hosts of the nodes. The invention may further plan a central Central control server as a superior Master host of the Login host and the Master host of each independent node, so that the Central control server, as a dispatch center, manages the Login host and the Master host of respective independent nodes to further indirectly and uniformly manage the host of the nodes. In the invention, the Central will be deployed with a WEB system to incorporate various daily necessary functions. It unifies the various collected data as a data overview to display IT resources of all nodes, and displaying real-time monitoring of related data according to an application grouping dimension and so on so as to allow the users to have a clear view of various IT resources.

The embodiment provides a multi-operation and maintenance management system, which further includes:
multiple independent nodes 21, 22 and 23: dividing according to independent network areas of respective business sites to treat each independent VPC network (Virtual Private Cloud) environment in different regions as an independent node, the nodes at least include a machine as a security entrance Login host 211 of the node and a machine as an operation and maintenance management and control Master host 212 of the node. The operation and maintenance management and control Master host 212 may manage and control a plurality of business hosts 213. Among them:

a sentinel program is set for each Master host 212, which is responsible for monitoring and recording events such as access and offline of the business host of the node where the sentinel program is located to jointly update the configuration file used for local monitoring or batch operation and maintenance, the configuration file used for batch operation and maintenance further including the configuration file in the application group dimension; an initialization script of the accessed new machine is set on the Master host 212 of the nodes for the Mater machine 212 of the node to trigger a Salt-Minion event once a new business host 213 is accessed in a certain node;

the Salt-Minion access event may further include: completing initialization steps including naming the new machine according to the three-section rule of application group-intranet IP-network area, installing the Salt-Minion on the new machine and configuring the Master host 212 belonged thereto after the new business host 213 executes the initialization script.

A Central control server 10 serves as a superior Master host of the Login host 211 and the Master host 212 of each independent node; the Central control server is deployed with a WEB system and has a build file and configuration information of a global system, and the Central control server 10 regularly maintains synchronization of related data of the corresponding node with the Master host 212 of the nodes for determining the node where the application group is located when a certain application group updates the operation and maintenance management data through the Master host 212 of the corresponding node and obtaining all machine names of the same application group according to an application group field to further writing the configuration file for batch operation and maintenance management to the above machines through the Salt-Minion.

The core of the invention lies in the separation of powers. The Login host 211 is only responsible for the security login entrance, the Master host 212 is only responsible for executing dispatching tasks, and the Central Master host 10 is only responsible for the issuing and dispatch of tasks. In this way, the system is highly secure and reliable. For example, if there is a problem with the service of the Central control server 10, it will not affect the assigned permission, and the nodes are independent of each other and does not affect each other. The Login and the Master play the role of a "manager" in a sense; once the Login or Master host of a certain node encounters an unrecoverable exception, the central control machine 10 may quickly regenerate a new Login or Master on the node, because the master control machine has the configuration data of the Login host 211 and the Master host 212 of the nodes as well as the full amount of system permission distribution historical data, which may be quickly generated, and also the data of the Central control server 10 is backed up every day; the data related to the node is synchronized to the Master host 212 of the corresponding node every day ("every day" is an example, mainly a specified period); as a result, the data of the master controller is very safe, and the system may expand and manage new nodes according to actual projects and enterprise development needs. In other words, the configuration management of the hosts in the nodes is unified: adopting the master controller+distributed bastion host architecture and equipping with the working mechanism corresponding to the architecture to unify the configuration management of the hosts in the nodes and realize the operation and maintenance of multiple nodes.

The core part is explained below through specific embodiments:

user machine permission: essentially, the Central control server 10 dispatches a certain Master host 212 to issue a task to a certain user to create his account on a certain machine.

machine monitoring: the essence is that the Central control server 10 dispatches a certain Master host 212 to issue a task of deploying the monitoring agent program to all the business machines of the node.

daily operation and maintenance: similarly, a certain Master host 212 performs a certain task on a certain group of machines or global machines.

Therefore, no matter distribution of user permission, daily deployment of machine monitoring and network monitoring or batch management of daily operation and maintenance, the operation and maintenance method and system can be abstracted as follows: master control dispatches a Master of a certain area node to issue and execute a certain task, and unified management is naturally achieved; the design concept can be continued subsequently to integrate the management of container clusters and continuously expand management objects to make the functionality more powerful and efficient, wherein to a certain extent, there is no difference between managing dozens of network areas and managing one network area for the bastion machine; whether there are a few machines or dozens or thousands of machines, the management cost will not change significantly.

The invention sets the operation of machines/users in the node to perform a certain task on a certain machine or a certain group of machines or a global machine. The permission management, the daily operation and maintenance, the security management, etc. are unified and set as task management and control based on a certain node and a certain machine.

the Master host 212 in this node serves as the master controller of the node to preset the related contents including the tool script library, the crontab task, and the configuration file in the Redis of the node, and a new machine is configured to manage Salt-Master access of the node when the new machine is accessed to a certain node: completing initialization operations of the new machine by running an access machine initialization script of the Master host 212 of the node to give the new machine a standardized name and installing a Salt-Minion as well as configuring the Master host belonged thereto, and performing the management for access of the Master host of the node immediately after execution to record the Redis of the node and the Redis of a remote Central control server. The more important part of access management is to obtain the tool script library, complete the crontab task, and automatically configure the configuration file. When the information needs to be customized, updated or modified, it is also sent to the Master host 212 in the form of a task through the Central control server 10, and then the Master host 212 updates it to the corresponding location to control the corresponding machine to complete the corresponding task through a takeover program.

This kind of operation and maintenance management realizes unified management and has strong scalability.

Figure 2:
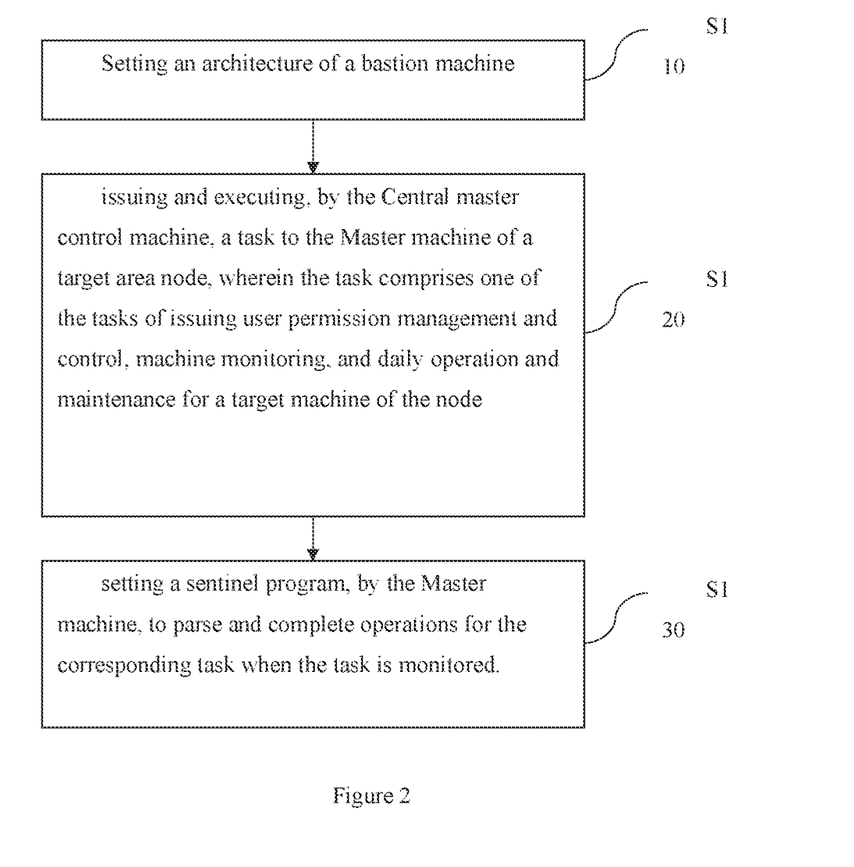
FIG. 2 is a diagram of the principle of an operation and maintenance management method according to an embodiment of the invention.

With reference to FIG. 2, the embodiment provides an operation and maintenance method for automatically and uniformly managing nodes of bastion host, which includes the following steps.

S110: an architecture of the bastion host is set:

dividing according to independent network areas of respective business sites to treat each independent network environment in different regions as an independent node, and then in the nodes, planning a machine as a security entrance Login host of the nodes and a machine as an operation and maintenance management and control Master host of the nodes, the Master being responsible for managing all business hosts of the node;

setting a Central control server as a superior Master host of the Login host and the Master host of each node, wherein the Central control server is deployed with a WEB system and has a build file and configuration information of a global system, and the Central control server regularly maintains synchronization of related data of the corresponding node with the Master host of the nodes.

S120: The Central control server issues and executes a task to the Master host of a target area node, wherein the task includes one of the tasks of issuing user permission management and control, machine monitoring, and daily operation and maintenance for a target machine of the node.

S130: The Master host sets a sentinel program to parse and complete operations for the corresponding task when the task is detected.

The Master host of a certain node triggers a Salt-Minion access event once a certain node is accessed to a new business host: performing initialization steps including naming the new machine according to the three-section rule of application group-intranet IP-network area, installing the Salt-Minion on the new machine and configuring the Master host belonged thereto after the new machine executes the initialization script.

When a certain application group updates operation and maintenance management data, the node where the application group is located is determined, all machine names of the same application group are obtained through the Master host of the corresponding node according to an application group field, and further a batch operation and maintenance management configuration file is written to the above machines through the Salt-Minion.

The Master belonged thereto is found according to the network area field to perform the corresponding task when the Central control machine parses the business host name.

Naming the new machine is completed according to the three-section rule of the application group-intranet IP-network area after the new machine executes the initialization script, the network areas having an independently named intranet IP, the intranet IPs in different network areas being the same.

The system's default machine naming rule is "Application Group-Intranet IP-Network Area". The Application Group-Intranet IP-Network Area describes the application group where the machine is located, the network area where the machine is located (i.e. node information) and the intranet IP information of the machine in the network area. The positioning of the new machine is achieved through the network area (i.e., node information) where the machine is located and the intranet IP information of the machine in the network area. For example, The machine name "gateway-192.168.104.214-Hangzhou"

may be resolved as a gateway machine in the entire multi-operation and maintenance management system, which has an intranet IP of 192.168.104.214, and this machine is under the network area of Hangzhou.

After the user submits the permission application for the above machine, the Central control server may find its own dispatched Master according to the network area field to perform the task, so the intranet IP of each network area may be repeated without affecting the global management of the system.

For the "sentinel" program of their respective nodes, when a new machine is accessed to the node, it can be naturally divided by field; for example, all machine names of the same application group are obtained according to the application group field, and then written into the configuration file for batch operation and maintenance management, such as /etc/salt/master.d/nodegroup.conf和 /etc/ansible/hosts while automatically generating a monitoring configuration file of Prometheus on the business host, such as
. . .
  targets:
    192.168.104.214:9100
  labels:
    group: gateway
    ip: 192.168.104.214
    region: Hangzhou
    instance: gateway-192.168.104.214-Hangzhou
. . . .

In this way, once an alarm is triggered, the system may clearly see which network area the alarm came from and what business machine it is from. These capabilities are derived from the very concise three-stage naming structure of the system.

In addition, the method also needs to explain the benefits of the management method of separation of powers, including the Login host and the Master host. The Login host, as the security entrance machine of the node where the Login host is located, exposes a standard sshd port to the outside so that the user is assigned a login_id_rsa to log in to the corresponding Login host to enter an intranet of the node where the Login host is located. A basic component is deployed on the Master host of the node, which further includes: deploying the Salt-Minion to receive a dispatch task from the Central control server, deploying a Redis to record the related data corresponding to user permission-machine in the node, and deploying the Salt-Master to receive and manage the business host with the Salt-Minion installed in the node. The Master host, as the operation and maintenance management and control machine in the network area, does not expose any ports to the outside, and trusts the network access of the Central control server internally. The Central control server synchronizes respective basic template management after the initial installation of the Login and the Master of the nodes is completed:

a #salt -N login state.apply group.login completes the template synchronization of the Login host;

a #salt -N master state.apply group.master completes the template synchronization of the Master host.

In fact, for the Central machine, naming one salt '*' state.apply may complete the template synchronization management of two sets of machines on one node, including the synchronization of the basic configuration of the two sets of machines, the issuing of the "sentinel" programs of the nodes, etc.

Specifically, the initialization of the new machine means that the new machine is accessed and managed by the Salt-Master of the node where the new machine is located; the Master of the nodes has an accessed machine initialization script, and the initialization is completed immediately after the new machine executes; the core function of this script is to standardize the naming of the new machine, install Salt-Minion and configure the Master belonged thereto, and to be immediately accessed and managed by the Master host of the node where the new machine is located after execution while triggering the access event to record into the Redis of the local area and the Redis of a remote master controller.

The Central control server has the build file and the configuration with the global system including the Login host and the Master host of the nodes, and regularly back up the core data to the Master host of the nodes. Under normal circumstances, all files in the global system of the master controller will also be synchronized to the enterprise Git repository to ensure that they will not be lost. This configuration prevents the problem of losing the core configuration files of the system; and if there is a problem with the Central control server, the system may download the build file of the global system from any Master or Git repository to quickly build a new Central control server. Also, if there is a problem with one of the Login host or one of the certain Master host, the Central control server may also generate a corresponding new Login host or Master host through the template and the core data.

The management for user machine permission is performed by the Central control server to dispatch an adapted Master to issue a task to the user to create his account on the corresponding machine; the machine monitoring is performed by the Central control server to dispatch the adapted Master to issue a task of deploying the monitoring agent program to all the business machines of the node; the daily operation and maintenance operation is performed by the Central control server to execute a certain task for an adapted group of machines or the global machines on the adapted Master, so as to achieve unified management. Therefore no matter distribution of user permission, daily deployment of machine monitoring and network monitoring or batch management of daily operation and maintenance, the system may be abstracted as follows: the Central control server dispatches a Master of a certain area node to issue and execute a certain task, and unified management is naturally achieved; the design concept can be continued subsequently for the invention to integrate the management of container clusters and continuously expand management objects to make the functionality more powerful and efficient, wherein to a certain extent, there is no difference between managing dozens of network areas and managing one network area for the system; whether there are a few machines or dozens or thousands of machines, the management cost will not change significantly for the system.

As mentioned above, all machine names of the same application group are obtained through the Master host of the corresponding node according to an application group field, and further a batch operation and maintenance management configuration file is written to the above machines through the Salt-Minion, which further includes: using the Central control server to dispatch and adapt the Master for executing the corresponding configuration files for machines that meet the requirements, wherein the meeting the requirements further includes causing the application group names to meet the requirements. The application group may be divided into application groups of different machines according to the functions implemented in the management system, and may also be divided into application groups of different machines according to the applications implemented in the management system. With this three-section naming method and the management method of the system, the invention may achieve batch management of business machine clusters through the application group dimension.

In addition, in the method, when a new business host is accessed, a monitoring configuration file of Prometheus may be automatically generated; the local Master host detects an alarm message, and synchronizes the alarm information including a host name where the alarm is located to the Central control server; the Central control server parses the application group and the network area where the alarm information host is located through the host name where the alarm information occurs; the corresponding execution task is issued to the Master host of the node that is adapted if the corresponding business host of the network area and/or the application group needs to be processed according to the alarm information.

The automatically generating a monitoring configuration file of Prometheus on the business host further includes the following.

The core configuration is uniformly distributed from the Central control server to the Master of the nodes, specifically to the monitoring object of the nodes: when a new business host in the node is accessed, the configuration is automatically generated on the host;

through the API of the cloud service provider, an alarm is configured for Aliyun and AWS cloud monitoring data acquisition, and also the Prometheus network monitoring component blackbox_exporter is deployed on the Master host as the network monitoring and detection service of the node;

when the business host is accessed to the node, it obtains the Prometheus monitoring configuration file through the Master host of the node;

three alarm levels info/warning/critical are set: The node collects monitoring data→The node matches the early warning rules→The node issues alarms including phone calls and self-governs the alarms of the node, while initiating to monitor and detect the Central control server itself and initiating early warning notifications in a timely manner; of course, the Central control server itself also initiates related service detection of the Master of the nodes to complete the self-monitoring of the system itself; in this way, whether there is a problem with the basic services of the Central control server or the basic services of each Master, an alarm will be received and handled in a timely manner.

In addition, when a new machine executes the access script, it completes the management of the Master in the area where it is located; the default SaltStack execution template rules are set according to the invention, and then a series of template actions on the new machine are performed, mainly including 7 general templates (the 7 general templates are only examples and are not used to limit the invention):

1. The synchronization series tool scripts are in the /opt/sys/ directory of the new machine, the init.sh is the initialization script, the name.sh is the renaming script, and the src.sh is the basic software installation script written by the invention, etc.; these scripts may be continuously expanded according to our daily work; that is to say, after the new machine is taken over, we have agreed that some tool scripts required by default are in the /opt/sys/ directory, which is convenient for every technician to use, and when a certain script needs to be updated, all scripts in the system may be updated to the same version through the above method.

2. The default crontab task is written in, including the disk cleanup task and the salt-minion automatic pull task (placed in salt-minion due to various abnormal offline problems); of course, these basic tasks may also be continuously expanded according to the needs of daily work.

3. The default basic configuration is executed, such as the public key information to be entered by default, and this information may be customized and expanded in the /srv/pillar/master.sls of the respective node; for example, as soon as a new machine is accessed, the publishing machine public key s entered immediately, thereby completing the channel problem of the publishing machine public key. At the same time, some basic environment variables, the business running account that the system needs to create by default, and the connection number and configuration for the machines that has been adjusted, and so on may be automatically synchronized.

4. Defined basic tools are installed, such as vim, wget, etc.

5. A customized security sshd configuration file is automatically configured, Password authentication, full private key authentication, and the intranet IP and whitelist users trusted by the node are disabled by default.

6. Related configurations of the salt-minion are automatically synchronized.

7. Network parameters of the new machine are automatically set.

8. A customized template, and the nodes may customize related management tasks according to the needs of the nodes.

Since the template configuration file of each Master is issued and synchronized by the master control machine, the expansion changes of these template files are also updated from the master control and then synchronized to the Master of the nodes. The master control will be responsible for updating and synchronizing the above 7 general initialization template, and also some customized templates or files are agreed to customized by the nodes, which will not be updated by the master controller. This ensures the consistency of some global templates, tools, and files across the entire network and will not be maliciously adjusted or modified. The above-mentioned 7 general templates and the 8th customized template are just examples, and only some general templates may be used. The 8th custom template is set by the node itself. Only the Master host of this node takes over the corresponding machine according to the customized template to complete the corresponding task.

Corresponding to the above template settings, the following basic components are generally deployed on the Master host of each node:

1. Salt-Master, i.e., Salt management and control machine, for receiving and managing a business Salt-Minion machine within the node network.

2. Salt-API/Salt-Minion, for receiving the dispatch tasks of the master control Central machine.

3. Nginx, Salt source of local network area, for ensuring to download and update the Salt-Minion on the intranet of the business machine in this network area.

4. Influxdata time series database, for accessing the monitoring data of all business hosts managed by the Master.

5. Ansible, also deployed in the management and control machine to facilitate the operation and maintenance personnel who are familiar with Ansible to manage.

6. Prometheus, also deployed in the management and control machine, responsible for monitoring and alarming the node resources and peer-to-peer monitoring related services of the Central machine.

7. /opt/sys, with some common management tools generated by default, readable and understandable, used according to needs.

Similarly, the Central control server is correspondingly deployed with basic components as follows:
1. OpenResty Web server.
2. Redis, for recording full data of corresponding user permission-machine of each node.
3. PostgreSQL, for recording user information registered in the system.
4. Matrix dispatch controller, responsible for dispatching Login and Master to execute related tasks.
5. Prometheus monitoring system, responsible for monitoring relates services of Login and Master hosts of respective nodes.

For the above settings, the issuing a task of user permission management and control for the target machine of the node further includes the followings.

The Central control server generates a Local-Login RSA key pairs for users who apply and are authorized, and gives permission to create a user account on the Login host corresponding to the node so that the users have their own independent account, and records permission of the user in the Redis of the master controller, wherein the permission further includes contents such as related node information where the permission is adapted, a Master host, a permission type, and a permission aging length.

The Central control server sends the corresponding task corresponding to the Central to the Login or the Master hosts of related nodes where the permission is adapted.

The Master host receives the task, creates account information of the user, and records user-machine information including the permission aging length into the Redis on the Login of this node corresponding to the node.

Each node initiates a permission recovery program regularly to recycle the user-machine information whose permission has expired on the day to pass the user-machine information that is about to expire at an appointed time;

The corresponding record is deleted in the Redis of the master controller, and a task of the user permission management and control that the Master host of the corresponding node recovers permission of using the machine for the user is issued when the Central control server receives an emergency user permission management including a personnel resignation.

In the invention, the system extends and upgrades Salt Stack's simple one-level management structure Master-Minion to a multi-level management structure Master-Master-Minion (i.e., the basis of distribution). Traditional password authentication is abandoned during user management, the Local-Login RSA key pairs is generated for each user, and the user account for the Login of the corresponding node are created based on the administrator's authorization, so that the users have their own independent accounts. In addition, the simple SaltStack is a stateless task execution; the system adds related tasks such as database storage and performs stateful task execution and management, so that we can clearly record which user has the permission of which Login or Master, and so on. At the same time, on each Master master control machine, a "sentinel" program is developed, which is responsible for monitoring and recording the machine access and offline events of the node where it is located, linkedly updating the configuration file used for local monitoring or batch operation and maintenance, and synchronizing data on the Central control server as summary display such as displaying "how many area nodes are there in total in the system, how many applications are distributed on the nodes, how many machines are used in each application, etc."; the sentinel program is also responsible for writing the monitoring data collected in real time on the local Intranet in both directions, of which one part is written to the local time series database to be recorded, and the other part is written to the remote Central master control cache data as real-time monitoring data for display.

The new machine is configured to manage Salt-Master access of the node where when the new machine is accessed to a certain node: initialization operations of the new machine are completed by running an access machine initialization script of the Master host of the node to give the new machine a standardized name and a Salt-Minion is installed as well as configuring the Master host belonged thereto, and the management for access of the Master host of the node is performed immediately after execution to record the Redis of the node and the Redis of a remote Central control server.

The executing to be configured to manage Salt-Master access of the node where when a new machine is accessed to a certain node further includes: executing a preset publishing machine public key acquisition program to obtain public key information corresponding to the machine from a public key extension file in a preset location of the Redis of the node;

receiving the public key update, by the Master host, to update the new public key information in the public key extension file in the corresponding location of the Redis of the node     by issuing a task of the public key update to the Master host where the related node is located that is adapted to the user permission when the Central Master host generates the Local-Login RSA key pairs or the public key update for the users who apply and are authorized;

obtaining, by the corresponding machine, the corresponding updated public key information of the machine from the public key extension file at the preset location in the Redis of the node at the same time.

The executing a task of daily operation and maintenance of the machine includes: executing to be configured to manage Salt-Master access of the node when a new machine is accessed to a certain node further includes: obtaining a tool script library of a determined location in the Redis of the node to facilitate the synchronized series of a tool script for the user to use, writing a crontab task at the preset location including a disk cleanup task and a salt-minion automatic pull task, and automatically configuring a configuration file at a specified location;

sending, by the Central control machine, an update and/or an extension task including the tool script library, the crontab task, and the configuration file to the Master host of the corresponding node;

updating, by the Master host of the corresponding node, related contents such as the tool script library, the crontab task, and the configuration file corresponding to the specified location;

taking over, by the Master host, the corresponding machine to process contents related to the corresponding locations.

The Central control server sets the build file and the configuration information of the global system, and regularly synchronizes and backs up core data to the Master host of the nodes while synchronizing the build file and the configuration information of the global system to an enterprise Git repository; the build file and the configuration information of the global system are updated to the enterprise Git repository when a problem occurs with the Central control server; a new Login host and a new Master host are obtained and generated from the Central Master host through a template when a problem occurs with a certain Login host or Master host.

In another embodiment of the invention, an operation and maintenance system for automatically and uniformly managing nodes of bastion host is proposed, which further includes:

an architecture of the bastion host:
dividing according to independent network areas of respective business sites to treat each independent network environment in different regions as an independent node, and then in the nodes, planning a machine as a security entrance Login host of the nodes and a machine as an operation and maintenance management and control Master host of the nodes, the Master being responsible for managing all business hosts of the node;
a Central control server, as a superior Master host of the Login host and the Master host of each independent node, wherein the Central control server is deployed with a WEB system and has a build file and configuration information of a global system, and the Central control server regularly maintains synchronization of related data of the node with the Master host of the nodes, and the Central control machine is used to issue a task to the Master host of the target area node, the task including one of the tasks of issuing user permission management and control, machine monitoring, and daily operation and maintenance for a target machine of the node;
the Master host is used to set a sentinel program to parse and complete operations for the corresponding task when the task is detected.

The Redis is set on the nodes with a determined location stored with a tool script library, a crontab task and a configuration file respectively, the tool script library providing a series of synchronization a tool script for the user to use conveniently; the crontab task comprises a disk cleanup task and a salt-minion automatic pull task;

The Master host is further configured to receive an update and/or an extension task including the tool script library, the crontab task and the configuration file sent from the Central control server to the Master host of the corresponding node, to update the tool script library, the crontab task, the configuration file and other related contents corresponding to the specified location, and then taking over to process the contents related to the corresponding location.

The invention claimed is:

1. An operation and maintenance method for automatically and uniformly managing nodes of bastion host, the operation and maintenance method comprising:
S1: setting an architecture of the bastion host;
dividing according to independent network areas of respective business sites to treat each independent network environment in different regions as an independent node, and then in each node, planning a machine as a security entrance Login host of the node and a machine as an operation and maintenance management and control Master host of the node, the Master host being responsible for managing all business hosts of the node;
setting a Central control server as a superior Master host of the Login host and the Master host of each node, wherein the Central control server is deployed with a system and has a build file and configuration information of a global system, and the Central control server regularly maintains synchronization of related data of the corresponding node with the Master host of the nodes;
S2: issuing and executing, by the Central control server, a task to the Master host of a target area node, wherein the task comprises one of the tasks of issuing user permission management and control, machine monitoring, and daily operation and maintenance for a target machine of the target area node;
S3: setting a sentinel program, by the Master host, to parse and complete operations for the corresponding task when the task is monitored.

2. The operation and maintenance method for automatically and uniformly managing nodes of bastion host according to claim 1, wherein the task of issuing user permission management and control for a target machine of the target area node further comprises:
by the Central control server, generating a Local-Login RSA key pairs for users who apply and are authorized, and giving permission to create a user account on the Login host corresponding to the target area node so that the users have their own independent account, and recording permission of the user in a Redis of a master controller, wherein the permission further comprises contents such as related node information where the permission is adapted, a Master host, a permission type, and a permission aging length;
by the Central control server, sending the corresponding task to the Login host or the Master host of related nodes where the permission is adapted;
by the Master host, receiving the task, creating account information of the user, and recording user-machine information comprising the permission aging length into the Redis on the Login host of the target area node corresponding to the related nodes where the permission is adapted;
by each target area node, initiating a permission recovery program regularly to recycle the user-machine information whose permission has expired on the day to pass the user-machine information that is about to expire at an appointed time;
deleting the corresponding record in the Redis of the master controller, and issuing a task of the user permission management and control that the Master host of the corresponding node recovers permission of using the machine for the user when the Central control server receives an emergency user permission management comprising a personnel resignation.

3. The operation and maintenance method for automatically and uniformly managing nodes of bastion host according to claim 2, further comprising:
when a new machine is accessed to one of the node, executing to be configured to manage Salt-Master access of the node:
completing initialization operations of the new machine by running an access machine initialization script of the Master host of the node to give the new machine a standardized name, installing a Salt-Minion, configuring the Master host belonged thereto, and performing the management for access of the Master host of the node by the new machine immediately after execution to record the Redis of the node and the Redis of a remote Central control server.

4. The operation and maintenance method for automatically and uniformly managing nodes of bastion host according to claim 3, wherein the step of executing to be configured to manage Salt-Master access of the node when the new machine is accessed to one of the node further comprises:

executing a preset publishing machine public key acquisition program to obtain public key information corresponding to the new machine from a public key extension file in a preset location of the Redis of the node;

issuing a task of updating the public key to the Master host where the related node is located that is adapted to the user permission when the Central Master host generates the Local-Login RSA key pairs or updates the public key for the users who apply and are authorized;

receiving the task of updating the public key, by the Master host, to update new public key information in the public key extension file in the corresponding location of the Redis of the node;

at the same time, obtaining, by the corresponding machine, the corresponding updated public key information of the new machine from the public key extension file at the preset location in the Redis of the node.

5. The operation and maintenance method for automatically and uniformly managing nodes of bastion host according to claim 3, wherein the step of executing the Master host to complete a task of daily operation and maintenance comprises:

the executing to be configured to manage Salt-Master access of the node where the new machine is located when a new machine is accessed to a certain node further comprises: obtaining a tool script library of a determined location in the Redis of the node to facilitate the synchronized series of a tool script for the user to use, writing a crontab task at the preset location comprising a disk cleanup task and a salt-minion automatic pull task, and automatically configuring a configuration file at a specified location;

sending, by the Central control machine, an update and/or an extension task comprising the tool script library, the crontab task, and the configuration file to the Master host of the corresponding node;

updating, by the Master host of the corresponding node, related contents such as the tool script library, the crontab task, and the configuration file corresponding to the specified location;

taking over, by the Master host, the corresponding machine to process contents related to the corresponding locations.

6. The operation and maintenance method for automatically and uniformly managing nodes of bastion host according to claim 1, further comprising:

by the Central control server, setting the build file and the configuration information of the global system, and regularly synchronizing and backing up core data to the Master host of the nodes while synchronizing the build file and the configuration information of the global system to an enterprise Git repository;

updating the build file and the configuration information of the global system to the enterprise Git repository when a problem occurs with the Central control server;

obtaining and generating a new Login host and a new Master host from the Central Master host through a template when a problem occurs with the Login host or the Master host.

7. The operation and maintenance method for automatically and uniformly managing nodes of bastion host according to claim 1, further comprising:

by the Central control server as a dispatch center, managing the Login host and the Master host of respective independent nodes to indirectly and uniformly manage the host of the nodes;

by the Central control server, deploying the system to consolidate various daily necessary functions, unifying the various collected data as a data overview to display IT resources of the nodes, and displaying real-time monitoring of related data according to an application grouping dimension.

8. The operation and maintenance method for automatically and uniformly managing nodes of bastion host according to claim 1, further comprising:

setting the sentinel program for each Master host, the sentinel program being responsible for monitoring and recording events such as access and offline of the business host of the node where the sentinel program is located, and jointly updating a configuration file used for local monitoring or batch operation and maintenance, the configuration file used for batch operation and maintenance further comprising a configuration file in the application group dimension; and setting an initialization script of the accessed new machine on the Master host of the nodes;

triggering, by the Master host of a certain node, a Salt-Minion access event once a certain node is accessed to a new business host: performing initialization steps comprising naming the new machine according to the three-section rule of application group-intranet IP-network area, installing the Salt-Minion on the new machine and configuring the Master host belonged thereto after the new machine executes the initialization script;

when a certain application group updates operation and maintenance management data, determining the node where the application group is located, obtaining all machine names of the same application group through the Master host of the node where the application group is located according to an application group field, and further writing a batch operation and maintenance management configuration file to the above machines through the Salt-Minion.

9. The operation and maintenance method for automatically and uniformly managing nodes of bastion host according to claim 8, further comprising:

automatically generating a monitoring configuration file of Prometheus on the business host;

by the local Master host, detecting an alarm message, and synchronizing the alarm information comprising a host name where the alarm is located to the Central control server;

by the Central control server, parsing the application group and the network area where the alarm information host is located through the host name where the alarm information occurs;

issuing the corresponding execution task to the Master host of the node that is adapted if the corresponding business host of the network area and/or the application group needs to be processed according to the alarm information.

10. The operation and maintenance method for automatically and uniformly managing nodes of bastion host according to claim 8, further comprising:

finding the Master host belonged thereto according to the network area field and performing the corresponding task when the Central control machine parses the business host name;

completing naming the new machine according to the three-section rule of the application group-intranet IP-network area after the new machine executes the initialization script, the network areas having an independently named intranet IP, the intranet IPs in different network areas being the same.

11. The operation and maintenance method for automatically and uniformly managing nodes of bastion host according to claim 8, further comprising:
exposing, by the Login host as the security entrance machine of the node where the Login host is located, a standard sshd port to the outside so that the user is assigned a login_id_rsa to log in to the corresponding Login host to enter an intranet of the node where the Login host is located.

12. The operation and maintenance method for automatically and uniformly managing nodes of bastion host according to claim 8, further comprising: deploying a basic component on the Master host of the node, which further comprises: deploying the Salt-Minion to receive a dispatch task from the Central control server, deploying a Redis to record the related data corresponding to user permission-machine in the node, and deploying the Salt-Master to receive and manage the business host with the Salt-Minion installed in the node:
not exposing, by the Master host as the operation and maintenance management and control machine in the network area, any ports to the outside, and trusting the network access of the Central control server internally;
synchronizing, by the Central control server, respective basic template management after the initial installation of the Login host and the Master host of the nodes is completed: completing, by a #salt -N login state.apply group.login, template synchronization to the Login host, and completing, by a #salt -N master state.apply group.master, template synchronization to the Master host.

13. The operation and maintenance method for automatically and uniformly managing nodes of bastion host according to claim 1, further comprising:
when a new machine is accessed to one of the node, executing to be configured to manage Salt-Master access of the node:
completing initialization operations of the new machine by running an access machine initialization script of the Master host of the node to give the new machine a standardized name, installing a Salt-Minion, configuring the Master host belonged thereto, and performing the management for access of the Master host of the node by the new machine immediately after execution to record the Redis of the node and the Redis of a remote Central control server.

14. The operation and maintenance method for automatically and uniformly managing nodes of bastion host according to claim 13, wherein the step of executing to be configured to manage Salt-Master access of the node when the new machine is accessed to one of the node further comprises:
executing a preset publishing machine public key acquisition program to obtain public key information corresponding to the new machine from a public key extension file in a preset location of the Redis of the node;
issuing a task of updating the public key to the Master host where the related node is located that is adapted to the user permission when the Central Master host generates the Local-Login RSA key pairs or updates the public key for the users who apply and are authorized;
receiving the task of updating the public key, by the Master host, to update new public key information in the public key extension file in the corresponding location of the Redis of the node;
at the same time, obtaining, by the corresponding machine, the corresponding updated public key information of the new machine from the public key extension file at the preset location in the Redis of the node.

15. The operation and maintenance method for automatically and uniformly managing nodes of bastion host according to claim 13, wherein the step of executing the Master host to complete a task of daily operation and maintenance comprises:
the executing to be configured to manage Salt-Master access of the node where the new machine is located when a new machine is accessed to a certain node further comprises: obtaining a tool script library of a determined location in the Redis of the node to facilitate the synchronized series of a tool script for the user to use, writing a crontab task at the preset location comprising a disk cleanup task and a salt-minion automatic pull task, and automatically configuring a configuration file at a specified location;
sending, by the Central control machine, an update and/or an extension task comprising the tool script library, the crontab task, and the configuration file to the Master host of the corresponding node;
updating, by the Master host of the corresponding node, related contents such as the tool script library, the crontab task, and the configuration file corresponding to the specified location;
taking over, by the Master host, the corresponding machine to process contents related to the corresponding locations.

16. An operation and maintenance system for automatically and uniformly managing nodes of bastion host, the operation and maintenance system comprising:
a processor; a memory storing computer-readable instructions that, when executed by the processor, cause the operation and maintenance system to implement:
an architecture of the bastion host that divides according to independent network areas of respective business sites to treat each independent network environment in different regions as an independent node, and then in the nodes, plans a machine as a security entrance Login host of the nodes and a machine as an operation and maintenance management and control Master host of the nodes, the Master host being responsible for managing all business hosts of the node;
a Central control server, as a superior Master host of the Login host and the Master host of each node, wherein the Central control server is deployed with a system and has a build file and configuration information of a global system, and the Central control server regularly maintains synchronization of related data of the corresponding node with the Master host of the nodes, and the Central control server is used to issue a task to the Master host of the target area node, the task comprising one of the tasks of issuing user permission management and control, machine monitoring, and daily operation and maintenance for a target machine of the target area node; and
wherein the Master host is used to set a sentinel program to parse and complete operations for the corresponding task when the task is detected.

17. The operation and maintenance system for automatically and uniformly managing nodes of bastion host according to claim 16, wherein, the Redis is set on the nodes with a determined location stored with a tool script library, a crontab task and a configuration file respectively, the tool script library providing a series of synchronization a tool script for the user to use conveniently; the crontab task comprises a disk cleanup task and a salt-minion automatic pull task;

the Master host is further configured to receive an update and/or an extension task comprising the tool script library, the crontab task and the configuration file sent from the Central control server to the Master host of the corresponding node, to update the tool script library, the crontab task, the configuration file and other related contents corresponding to the specified location, and then taking over to process the contents related to the corresponding location.

\* \* \* \* \*